United States Patent [19]

Pearman et al.

[11] Patent Number: 4,688,384
[45] Date of Patent: Aug. 25, 1987

[54] BRAKING BOOST PRESSURE MODULATOR AND METHOD

[75] Inventors: David J. Pearman, Marlborough; Zdenek S. Meistrick, Bloomfield, both of Conn.

[73] Assignee: The Jacobs Manufacturing Company, Bloomfield, Conn.

[21] Appl. No.: 723,191

[22] Filed: Apr. 15, 1985

[51] Int. Cl.$^4$ ............................................. F02B 37/00
[52] U.S. Cl. ......................................... 60/600; 60/611
[58] Field of Search .......................... 60/600, 601, 611

[56] References Cited

U.S. PATENT DOCUMENTS

| | | |
|---|---|---|
| 1,835,299 | 12/1931 | Greuter . |
| 2,558,968 | 7/1951 | Lee . |
| 3,220,392 | 11/1965 | Cummins . |
| 3,367,312 | 2/1968 | Jonsson . |
| 3,405,699 | 10/1968 | Laas . |
| 3,786,792 | 1/1974 | Pelizzoni . |
| 3,809,033 | 5/1974 | Cartledge ........................ 123/90.46 |
| 3,859,970 | 1/1975 | Dreisin . |
| 4,142,427 | 3/1979 | Grevich .............................. 74/863 |
| 4,150,640 | 4/1979 | Egan . |
| 4,271,796 | 6/1981 | Sickler ................................ 123/321 |
| 4,296,605 | 10/1981 | Price ..................................... 60/599 |
| 4,372,119 | 2/1983 | Gillbrand ............................. 60/600 |
| 4,398,510 | 8/1983 | Custer .............................. 123/90.16 |
| 4,429,532 | 2/1984 | Jakuba .................................. 60/600 |

FOREIGN PATENT DOCUMENTS

56-20720 2/1981 Japan .
57-46043 3/1982 Japan .

Primary Examiner—Douglas Hart
Attorney, Agent, or Firm—Donald E. Degling

[57] ABSTRACT

A method and apparatus for controlling the intake manifold air pressure during compression release engine retarding of a turbocharged internal combustion engine are disclosed. The apparatus comprises a solenoid actuated pressure responsive means communicating with the intake manifold and electrically connected to the control circuit for the compression release retarder. In one form of the invention, intake manifold air pressure is controlled so as not to exceed a predetermined maximum pressure during compression release retarding while in another form of the invention the intake manifold air pressure may be adjusted by the operator to any level up to a predetermined maximum level. By controlling the intake manifold air pressure the magnitude of the retarding horsepower developed by the engine and the loads imposed on certain of the engine components may be controlled.

8 Claims, 7 Drawing Figures

BRAKING BOOST PRESSURE MODULATOR AND METHOD

BACKGROUND OF THE INVENTION

1. Field of the Invention

This invention relates generally to the field of compression release retarders for internal combustion engines equipped with turbochargers. More particularly it relates to a method and apparatus to control the intake manifold air pressure during compression release engine retarding thereby controlling the cylinder pressure and the retarding horsepower developed by the engine retarder. Such control of the intake manifold air pressure limits the loads induced in the engine valve train and in the piston, connecting rod and crankshaft mechanism during compression release engine retarding.

2. Prior Art

Engine retarders of the compression release type are well-known in the art and are commonly used to augment the service brakes on commercial vehicles. Such engine retarders are designed to convert, temporarily, an internal combustion engine of the spark ignition or compression ignition type into an air compressor so as to develop a retarding horsepower which may be a substantial portion of the operating horsepower developed by the engine.

The compression release engine retarder of the type disclosed in Cummins U.S. Pat. No. 3,220,392 employs an hydraulic system wherein the motion of a master piston controls the motion of a slave piston which, in turn, opens the exhaust valve of the internal combustion engine near the end of the compression stroke whereby the work done in compressing the intake air is not recovered during the expansion or "power" stroke, but, instead, is dissipated through the exhaust and cooling systems of the vehicle. The master piston is customarily driven by a pushtube controlled by a cam on the engine camshaft which may be associated with the fuel injector of the cylinder involved or with the intake or exhaust valve of another cylinder.

One of the advantages of the compression release retarder of the type disclosed in the Cummins U.S. Pat. No. 3,220,392 is that it may be incorporated into an existing engine without redesign or reconstruction of the engine. This advantage distinguishes the Cummins type retarder from other compression release retarders which require extra cams or cam profiles (see Pelizzoni U.S. Pat. No. 3,786,792; Dreisin U.S. Pat. No. 3,859,970; Jonsson U.S. Pat. No. 3,367,312; and Cartledge U.S. Pat. No. 3,809,033). However, the use of existing valve train components to perform the compression release retarding function raises the risk that loading conditions may be encountered that are different, and perhaps more severe, than were contemplated in the original design of the engine.

Since the issuance of the basic compression release patents, including the Cummins U.S. Pat. No. 3,220,392, development efforts have been directed toward improving the retarding horsepower by improving the timing of the compression release event (Custer U.S. Pat. No. 4,398,510), preventing overtravel of the slave piston (Laas U.S. Pat. No. 3,405,699), preventing overpressure of the hydraulic system (Egan U.S. Pat. No. 3,150,640), preventing overload of the injector pushtube or camshaft by release of the pressure within the high pressure circuit of the retarder mechanism (Sickler U.S. Pat. No. 4,271,796) and increasing the inlet manifold pressure during retarding (Price U.S. Pat. No. 4,296,605).

Compression release retarders are commonly actuated by an electrically operated solenoid valve provided for each cylinder or pair of cylinders in the engine. Due to this arrangement, the retarding horsepower of the engine can be varied by selectively turning on and off the retarding mechanisms associated with one or more cylinders. Thus, several levels of retarding can be provided. However, uniform or gradual variation in the retarding horsepower (at a particular engine speed) is not attained with such mechanisms.

SUMMARY OF THE INVENTION

In order to protect the valve train mechanism during compression release retarding where some of the valve train or injector train components are used to perform the compression release function, it is necessary to limit or control the maximum loads which may occur. Similarly, to protect the piston and crankshaft from experiencing excessive loads during compression release retarding it is necessary to limit or control the cylinder pressure. Applicants have provided a simple but effective method and mechanism which not only limits the valve or injector train loading and the cylinder pressure but also, in some embodiments, provides an infinitely adjustable control of the retarding horsepower developed during compression release retarding. The mechanism includes a solenoid-controlled normally-closed pressure release or pressure regulator valve associated with the intake manifold or turbocharger outlet duct or any other duct communicating with the intake manifold, a pressure sensor or switch associated with the inlet manifold and an electrical control circuit interconnected with the control circuit for the compression release retarder. As used herein, the term "intake manifold" means the pressurized air intake system between the outlet of the supercharger or turbocharger and the engine intake valves. The pressurized air intake system may include, or incorporate, an aftercooler or intercooler designed to decrease the temperature of the pressurized air prior to the introduction of that air into the engine cylinder. In one form of the invention the intake manifold air pressure during compression release retarding is limited to a predetermined level. In an another form of the invention the intake manifold pressure during compression release retarding may be adjusted up to a predetermined level. Neither form of the invention affects the intake manifold air pressure during the powering mode of the engine.

DESCRIPTION OF THE DRAWINGS

Further objects and advantages of the invention will become apparent from the following detailed description of the invention and the accompanying drawings in which.

DETAILED DESCRIPTION OF THE INVENTION

Figure 1:
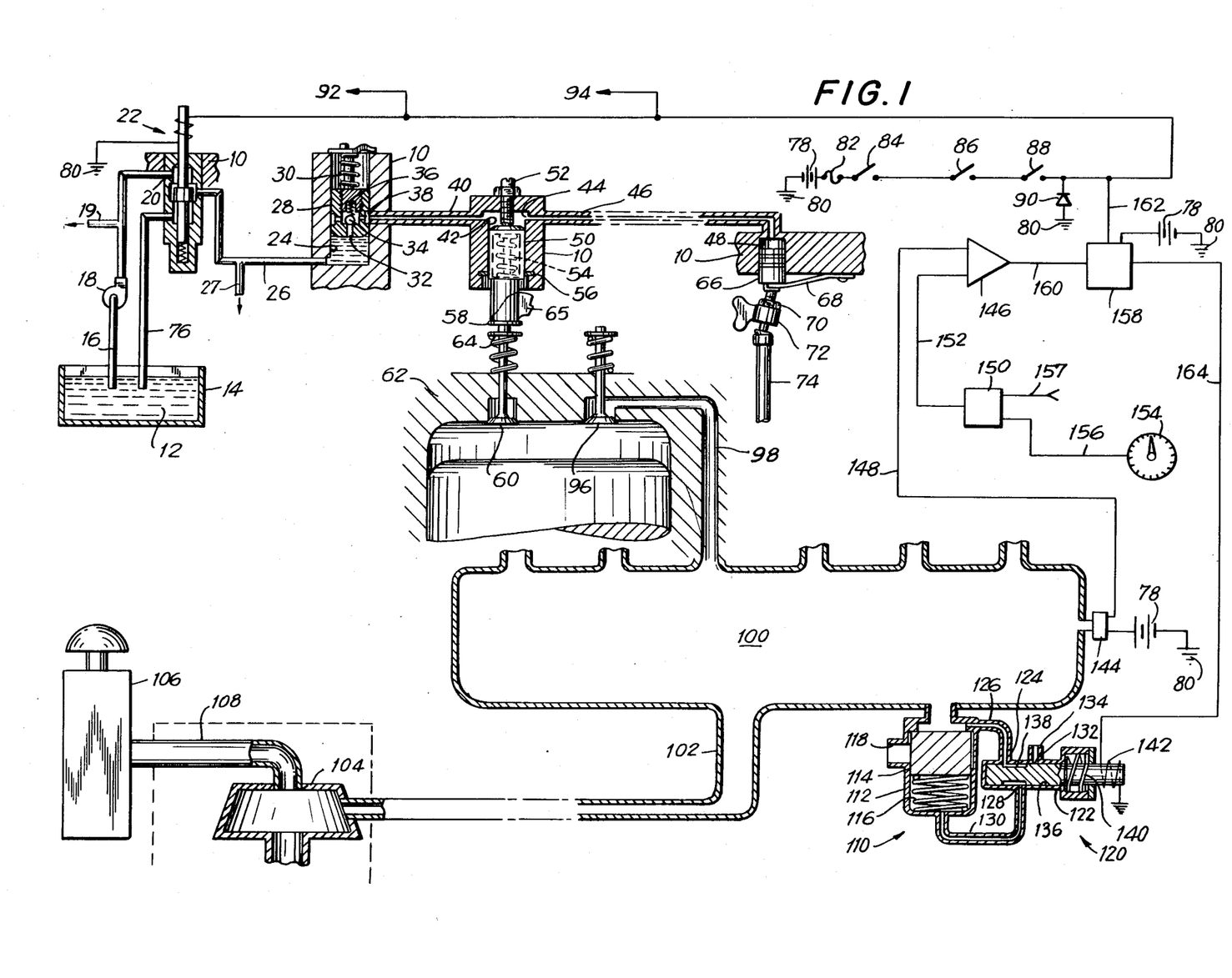
FIG. 1 is a schematic diagram of turbocharged internal combustion engine having a compression release retarder mechanism and an intake manifold air pressure controlling mechanism in accordance with the present invention.

FIG. 1 is a schematic diagram of a turbocharged internal combustion engine having a compression release retarder mechanism and an intake manifold air pressure controlling mechanism in accordance with the present invention. As noted above, the basic design of the compression release engine retarder is disclosed in the Cummins U.S. Pat. No. 3,220,392. For purposes of simplicity and clarity, the present invention will be described with reference to an engine retarder applied to a Cummins compression ignition engine in which the master piston of the engine retarder is driven by the injector pushtube. It will be understood that the invention may also be applied to other arrangements where, for example, the master piston is driven by an exhaust valve push-tube. It will be appreciated that the invention may also be applied to engines having other types of compression release retarders.

Referring now to FIG. 1, 10 represents a housing fitted on an internal combustion engine within which the components of the compression release engine retarder are contained. Oil 12 from a sump 14, which may be, for example, the engine crankcase, is pumped through a duct 16 by the engine lubricating oil pump 18 to the inlet 20 of a solenoid valve 22 mounted in the housing 10. Low pressure oil 12 is conducted from the solenoid valve 22 to a control cylinder 24 located in the housing 10 by duct 26. A control valve 28, fitted for reciprocating movement within the control cylinder 24, is urged toward a closed position by a compression spring 30. The control valve 28 contains an inlet passage 32 closed by a ball check valve 34 which is biased toward the closed position by a compression spring 36, and an outlet passage 38. When the control valve 28 is in the open position (as shown in FIG. 1), the outlet passage 38 registers with the control cylinder outlet duct 40 which communicates with the inlet of a slave cylinder 42 also formed in the housing 10. It will be understood that low pressure oil 12 passing through the solenoid valve 22 enters the control valve cylinder 24 and raises the control valve 28 to the open position. Thereafter, the ball check valve 34 opens against the bias of spring 36 to permit the oil 12 to flow into the slave cylinder 42. From the outlet 44 of the slave cylinder 42, the oil 12 flows through a duct 46 into the master cylinder 48 formed in the housing 10.

A slave piston 50 is fitted for reciprocating motion within the slave cylinder 42. The slave piston 50 is biased in an upward direction (as shown in FIG. 1), against an adjustable stop 52 by a compression spring 54 which is mounted within the slave cylinder 42 and acts against a bracket and snap ring 56 seated in the slave cylinder 42. The lower end of the slave piston 50 acts against a valve adapter 58 which engages the stem of the exhaust valve 60. The exhaust valve 60 is mounted for reciprocating motion in the engine cylinder head 62 and biased toward the closed position by valve spring 64. It will be understood that, in normal engine operation, a rocker arm 65 acts downwardly on the valve adapter 58 so as to open the exhaust valve 60. However, when the engine retarder is operating, the slave piston 50, when driven, will open the exhaust valve 60. Normally, the adjustable stop 52 is set to provide a clearance of about 0.018 inch (i.e., "lash") between the slave piston 50 and the valve adapter 58 when the exhaust valve 60 is closed, the slave piston 50 is seated against the adjustable stop 52 and the engine is cold. This clearance is required and is normally sufficient to accommodate expansion of the parts comprising the exhaust valve train when the engine is hot without opening the exhaust valve 60.

A master piston 66 is fitted for reciprocating movement within the master cylinder 48 and biased in an upward direction (as viewed in FIG. 1) by a light leaf spring 68. The lower end of the master piston 66 contacts an adjusting screw mechanism 70 for a rocker arm 72 controlled by a pushtube 74 driven from the engine cam shaft (not shown). As noted above, when applied to the Cummins engine, the rocker arm 72 is conveniently the fuel injector rocker arm and the pushtube 74 is the injector pushtube. In this circumstance, the pushtube 74 and the exhaust valve 60 are associated with the same engine cylinder.

It will be understood that when the solenoid valve 22 is opened, oil 12 will raise the control valve 28 and then fill both the slave cylinder 42 and the master cylinder 48. Reverse flow of oil out of the slave cylinder 42 and master cylinder 48 is prevented by the action of the ball check valve 34. However, once the system is filled with oil, upward movement of the pushtube 74 will drive the master piston 66 upwardly and the hydraulic pressure, in turn, will drive the slave piston 50 downwardly to open exhaust valve 60. The valve timing is selected so that the exhaust valve 60 is opened near the end of the compression stroke of the cylinder with which exhaust valve 60 is associated. Thus, the work done by the piston in compressing air during the compression stroke is released to the exhaust and cooling systems of the engine and is not recovered during the ensuing expansion stroke of the engine.

When it is desired to deactivate the compression release retarder, the solenoid valve 22 is closed. The oil 12 in the control valve cylinder 24 then flows back through the duct 26, the solenoid valve 22, and the return duct 76 to the sump 14. The control valve 28 will then be urged downwardly by the spring 30 and a portion of the oil in the slave cylinder 42 and master cylinder 48 will be vented over the top of the control valve 28 and returned to the sump 14 by duct means (not shown).

The electrical control system for the engine retarder includes the vehicle battery and alternator 78 which is grounded at 80. The hot terminal of the battery 78 is connected, in series to a fuse 82, a dash switch 84, a clutch switch 86, a throttle or fuel control switch 88, the solenoid 22 and back to ground 80. A diode 90 preferably is located between the solenoid 22 and the switches 84, 86 and 88 to protect the switches from arcing. The switches 84, 86 and 88 are provided to assure the safe operation of the system. Switch 84 is a manual control to deactivate the entire system. Switch 86 is an automatic switch connected to the vehicle clutch to deactivate the system whenever the clutch is disengaged so as to prevent engine stalling. Switch 88 is a second automatic switch connected to the throttle to deactivate the system whenever the throttle is opened.

It will be understood that there will be one master piston 66 and one slave piston 50 for each cylinder of the internal combustion engine. However, the solenoid valve 22 may control, for example, the compression release engine retarder hydraulic circuit for two cylinders, the connection for the second cylinder being made through the duct 27. Lines 92, 94, and oil passage 19, indicate electrical and hydraulic circuits leading to additional solenoid valves to control the retarder mechanisms for other engine cylinders.

In addition to the exhaust valve 60, each cylinder has at least one intake valve 96 located in the cylinder head 62. A passageway 98 located in the cylinder head 62 communicates between each intake valve 96 and the intake manifold 100. Air under pressure enters the intake manifold 100 through inlet duct 102 which is connected to the discharge port of a conventional turbocharger compressor 104. After passing through a conventional air cleaner 106, inlet air enters the compressor 104 through duct 108. As used herein, the term "intake manifold" means the pressurized air intake system between the outlet of the supercharger or turbocharger and the intake valves. The pressurized air intake system may include an aftercooler to cool the intake air before it is introduced into the engine cylinders. The pressurized air intake system may also include ducts leading to the service brake compressor since that compressor is commonly supplied from the pressurized air intake system.

In accordance with the present invention, a solenoid controlled regulator valve indicated generally at 110 communicates with the intake manifold 100. Regulator valve 110 is provided with a generally cylindrical body 112 that communicates at one end with the intake manifold 100. A valve piston 114 biased toward the closed position by a compression spring 116 is positioned within the body 112 for reciprocating motion. An exhaust orifice 118 is formed in the side of the cylindrical body 112 so as to communicate with the intake manifold 100 when the valve piston 114 is in the open position.

A three-way solenoid valve 120 controls the operation of the regulator valve 110. The solenoid valve 120 comprises a generally cylindrical body portion 122 having three ports. A first port 124 communicates with the intake manifold end of the body 112 through duct 126. A second port 128 communicates with the opposite end of the body 112 through duct 130. A third port 132 communicates with the ambient atmosphere through a nipple 134.

An axially movable spool 136 having a circumferential groove 138 is positioned within the body portion 122 of the solenoid valve 120. In its first or unactuated position, the circumferential groove 138 of the spool 136 spans the first port 124 and the second port 128 so as to communicate intake manifold air pressure to both sides of the regulator valve piston 114. A compression spring 140 biases the valve spool 136 to its first position. A solenoid coil 142 is adapted to drive the spool 136 to a second position wherein the groove 138 spans the second port 128 and the third port 132.

When the solenoid valve spool 136 is in its first or unactuated position whereby intake manifold air pressure is applied to both sides of the regulator valve piston 114 it will be appreciated that the regulator valve 110 will remain closed regardless of the air pressure existing within the inlet manifold 100. However, when the solenoid valve spool 136 is in its second or actuated position, the regulator valve 110 will open whenever the inlet manifold air pressure exerts a force on piston 114 which exceeds the force exerted by the compression spring 116.

An electrically actuated pressure sensor 144 of conventional design is mounted in the intake manifold 100. The sensor 144 is powered by the vehicle battery and alternator 78 and produces an electrical signal which is a function of the intake manifold air pressure. The output signal from the pressure sensor 144 is fed to a voltage comparator 146 of conventional design through conduit 148. A second signal is delivered to the voltage comparator 146 from a conventional voltage limiter 150 via conduit 152. The magnitude of the second signal is set by a multi-position selector switch 154 through conduit 156. The maximum or upper limit of the second signal is controlled by preset limit signal 156. The output signal from the voltage comparator 146 is delivered to the solenoid driver 158 through conduit 160. Solenoid driver 158, voltage comparator 146, voltage limiter 150, selector switch 154 and pressure sensor 144 are powered from the vehicle battery and alternator 78 while the driver 158 is switched on or off by means of a control signal from the retarder control circuit carried by conduit 162. Although direct battery connections are shown on FIG. 1 only for the solenoid drive 158 and the pressure sensor 144, it will be understood that similar connections are provided, as required, for the remaining components in the circuit. The output of the solenoid driver 158 powers the solenoid 142 through conduit 164.

The operation of the mechanism is as follows: whenever the engine retarder is employed, the solenoid driver 158, the pressure sensor 144, voltage comparator 146, voltage limiter 150 and selector switch 154 are activated. The pressure sensor 144 sends a signal, which is a function of the intake manifold air pressure, to the voltage comparator 146. Simultaneously, the limiter 150 sends a signal determined by the setting of the selector switch 154 or the preset limit 157, whichever is lower, to the voltage comparator 146. If the signal from the pressure sensor 144 is greater than the signal from the voltage limiter 150, the solenoid 142 will be actuated by the solenoid driver 158 and the spool 136 of the solenoid valve 120 driven from its first to its second position. When the spool 136 is in the second position, the regulator valve piston 114 will become unbalanced and will be moved to the open position permitting the air pressure within the intake manifold 100 to be vented through the regulator body 112 and the exhaust orifice 118.

The resulting decrease in the intake manifold air pressure will be reflected as a decrease in the magnitude of the signal produced by the pressure sensor 144. When this signal becomes equal to or less than the signal produced by the voltage limiter 150, the voltage comparator 146 will send a signal to the solenoid driver 158 that de-energizes the solenoid 142 and valve spool 136 will return to its first position.

It will, therefore, be appreciated that the apparatus in accordance with the present invention effectively controls the intake manifold air pressure and limits it to any desired level up to a predetermined maximum pressure.

Figure 6:
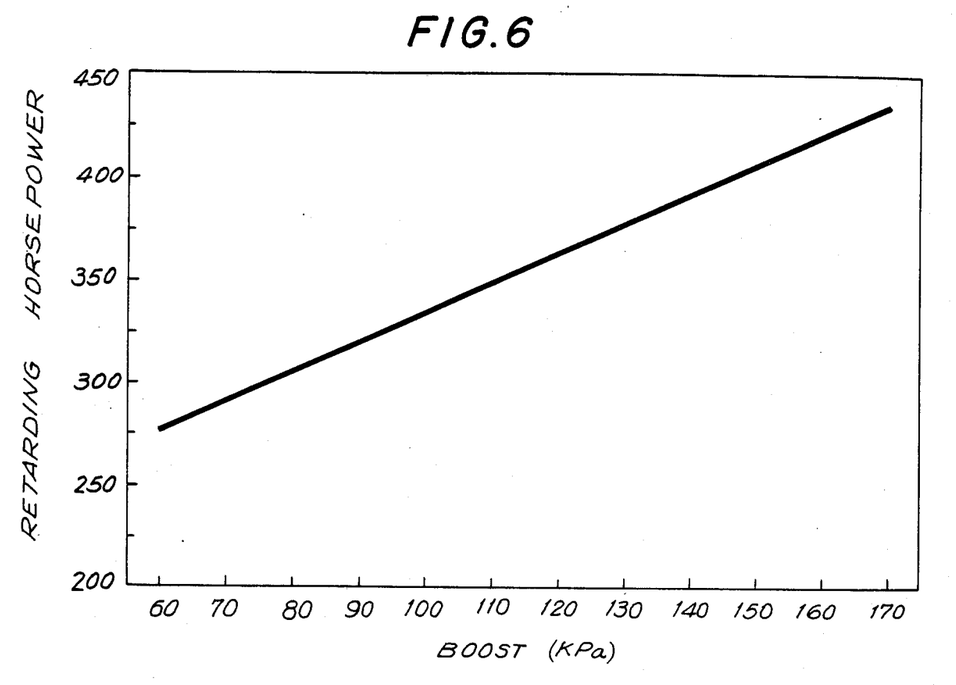
FIG. 6 is a graph showing the relationship between inlet manifold air (boost) pressure and retarding horsepower at an engine speed of 2100 r.p.m.

Referring now to FIG. 6 it will be understood that the retarding horsepower produced by a compression release engine retarder of the type shown in FIG. 1 is directly proportional to intake manifold air pressure at constant engine speed. The intake manifold air pressure is sometimes referred to as the boost pressure or, more simply, boost. Retarding horsepower varies with the cylinder pressure while cylinder pressure is determined by the formula:

$$P_{cyl} = P_b(CR)^K$$

where
 $P_{cyl}$ = cylinder pressure
 $P_b$ = Boost Pressure (i.e. intake manifold air pressure in absolute terms)
 CR = Compression Ratio at the piston position under consideration
 k = Ratio of specific heats ($C_p/C_v$)

Since the instantaneous compression ratio and the ratio of specific heats are fixed for a particular engine during engine retarding when only air is being compressed, there is a direct relation between boost pressure (i.e. intake manifold air pressure) and retarding horsepower as shown by FIG. 6 (for an engine speed of 2100 r.p.m.) and therefore intake manifold air pressure may be used as a control for retarding horsepower.

Figure 7:
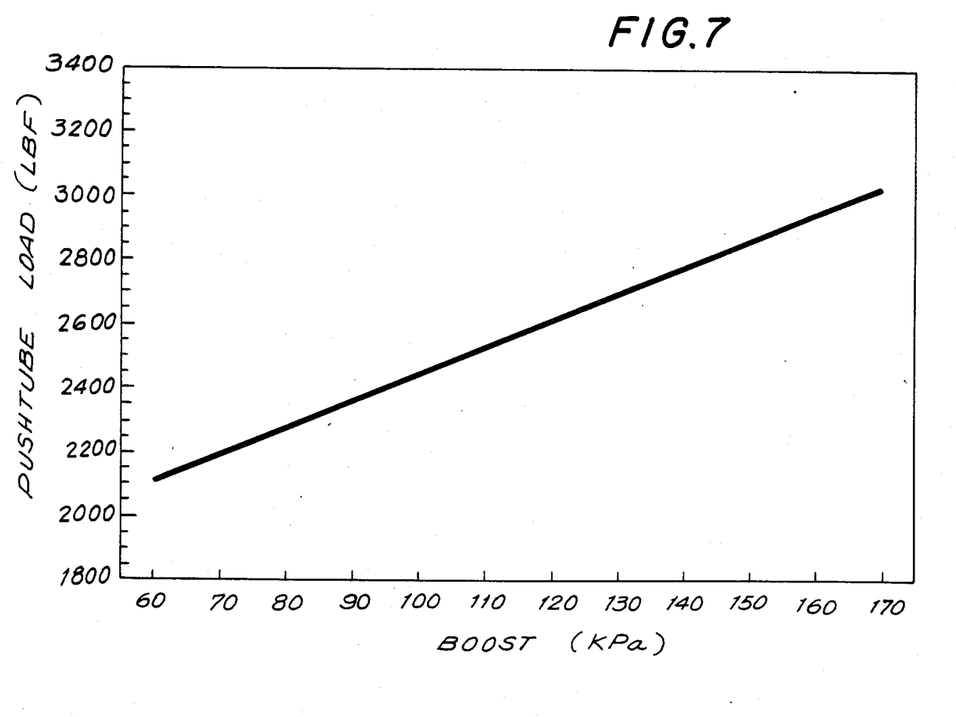
FIG. 7 is a graph showing the relationship between inlet manifold air (boost) pressure and pushtube load at an engine speed of 2100 r.p.m.

In a similar fashion, pushtube loading is directly related to intake manifold air pressure for a particular engine as shown in FIG. 7. The magnitude of the loading of the various components of the valve train including the cam, the cam follower and pushtube may be determined by measuring pushtube load. The compressive force on the pushtube (pushtube load) is shown by the formula:

$$F_{pt} = (A_v P_{cyl} + K)(A_{mp}/A_{sp})$$

where
 $F_{pt}$ = Compression force on the pushtube
 $A_v$ = Effective area of the exhaust valve
 $P_{cyl}$ = cylinder pressure
 $A_{mp}$ = Area of master piston (in engine retarder)
 $A_{sp}$ = Area of slave piston (in engine retarder)
 K = Sum of fixed parameters, including valve springs, inertia, etc.

Since the cylinder pressure varies with the intake manifold air pressure while the remaining terms are fixed for a particular engine, the pushtube load also varies directly with the inlet manifold air pressure as shown by FIG. 7 (for an engine speed of 2100 r.p.m.).

Figure 2:
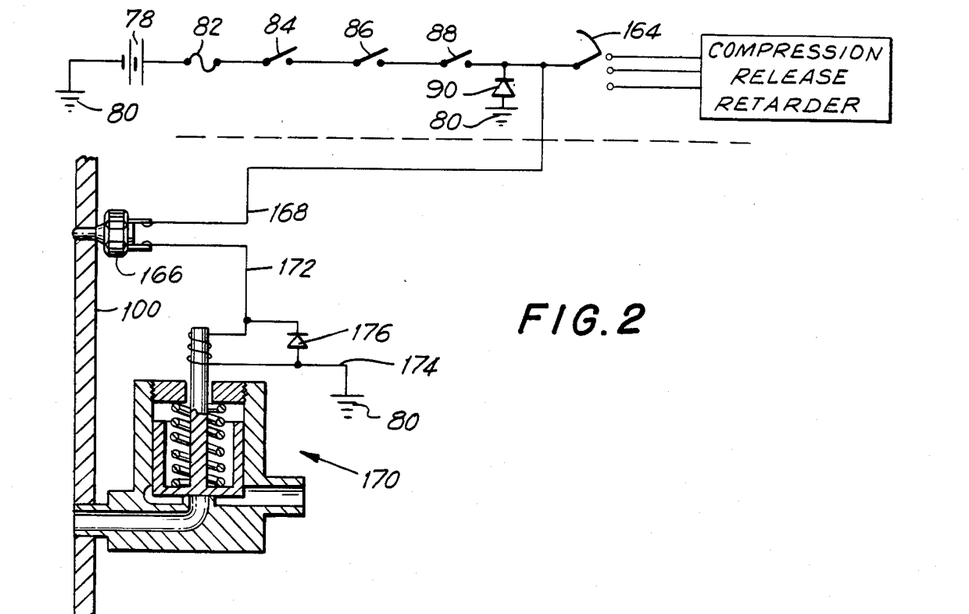
FIG. 2 is a fragmentary schematic diagram of an alternative mechanism to limit the maximum air pressure in the intake manifold during compression release retarding.

Reference is now made to FIG. 2 which shows an alternative form of the present invention in which a predetermined maximum intake manifold air pressure is used as a control. Parts which are common to FIGS. 1 and 2 are shown by the same numerical indications. It will be understood that the compression release retarder mechanisms are the same in FIGS. 1 and 2 except that in FIG. 2 a multiple selector switch 164 is shown to permit the use of fewer than all of the engine cylinders during a retarding mode of operation, if desired.

As shown in FIG. 2, a pressure switch 166 is installed in the intake manifold 100 so as to sense the pressure existing therein and is connected to the retarder control circuit through a conduit 168 so as to be energized whenever the retarder is in operation. A solenoid valve 170 is controlled by the pressure switch 166 through conduits 172, 174 so as to vent the intake manifold 100 whenever the pressure switch 166 closes and energizes the solenoid valve 170. Preferably, a diode 176 is placed across the terminals of the solenoid valve 170. In operation, the solenoid valve 170 will open whenever the intake manifold air pressure exceeds the preset value of the pressure switch 166 and will close whenever the intake manifold air pressure drops below this value. The intake manifold air pressure will thus vary cyclically about the predetermined pressure.

Figure 3:
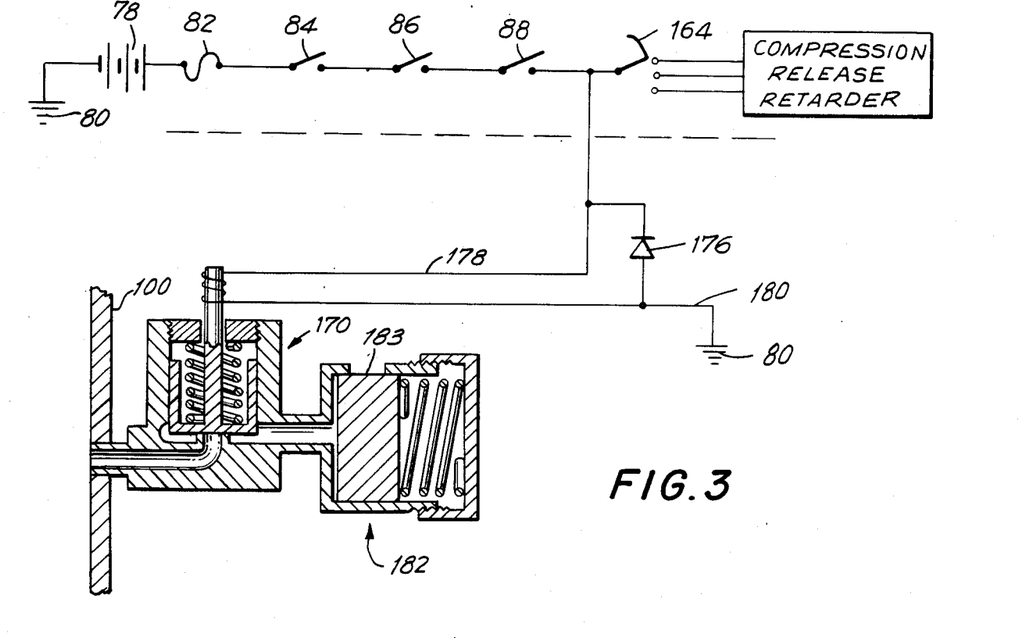
FIG. 3 is a fragmentary schematic diagram similar to FIG. 2 of a further alternative mechanism employing a pressure regulator to limit the maximum air pressure in the intake manifold during compression release retarding.

FIG. 3 shows another form of the present invention wherein a pressure regulator is employed instead of a pressure switch. Parts common to FIGS. 1 or 2 bear the same numerical designation and their description will not be repeated. As shown in FIG. 3, the solenoid valve 170 is energized directly from the retarder control circuit through conduit 178 and grounded through conduit 180. Preferably, a diode 176 is placed across the terminals of the solenoid valve 170. A pressure regulator 182 communicates between the outlet of the solenoid valve 170 and the ambient atmosphere. The pressure regulator 182 may comprise a spring loaded piston 183 designed to open at a prdetermined adjustable pressure. It will be appreciated that whenever the compression release retarder is activated, the solenoid of the solenoid valve 170 is energized and the solenoid valve 170 will be opened and the intake manifold air pressure will be directed to the spring loaded piston 183 of the pressure regulator 182 which will then limit the intake manifold air pressure to a maximum value predetermined by the setting of the regulator 182.

Figure 4:
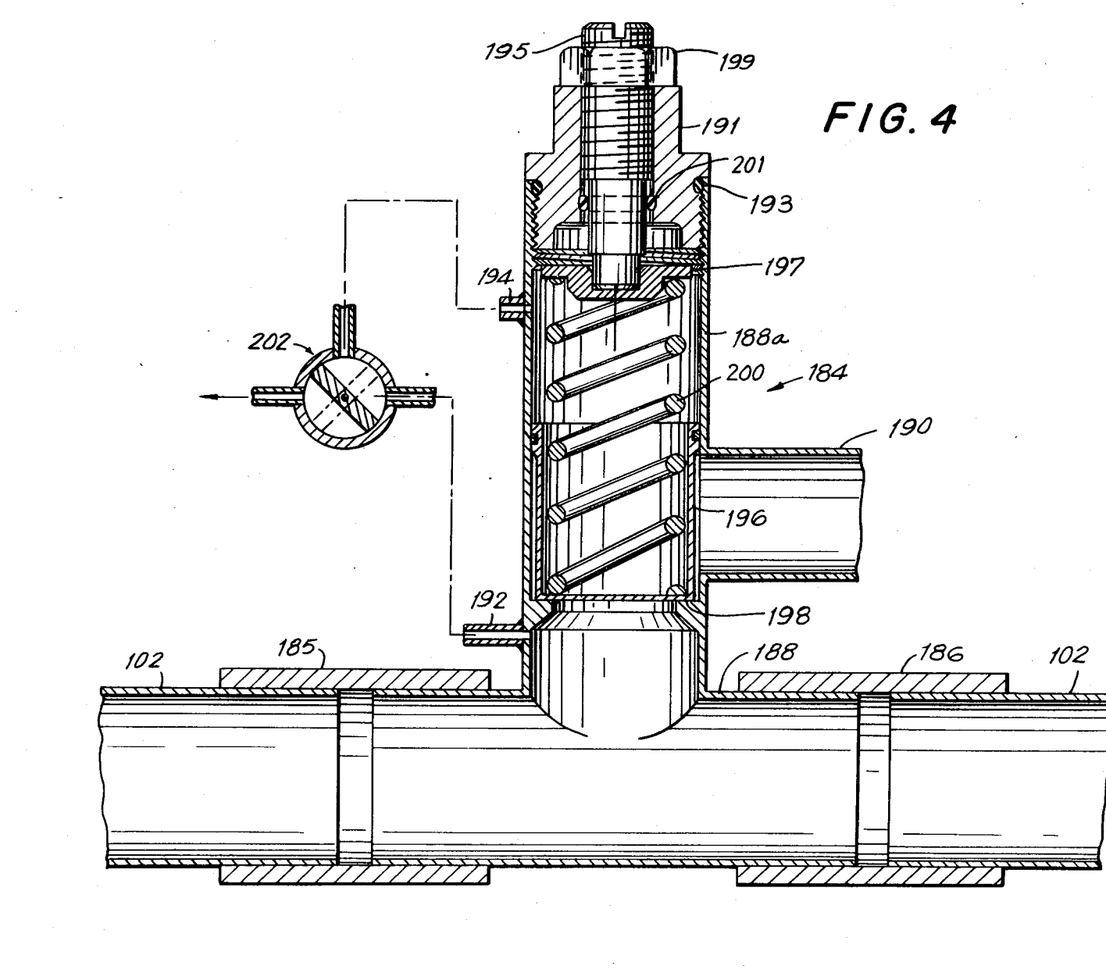
FIG. 4 is a cross sectional view of an alternative mechanism in accordance with the present invention installed in a duct communicating with the intake manifold.

FIG. 4 illustrates a still further embodiment of the present invention wherein the pressure control apparatus is located, for example, in the duct between the turbocharger or compressor outlet and the inlet to the intake manifold, e.g., inlet duct 102 as shown in FIG. 1. As shown in FIG. 4, the pressure control apparatus 184 replaces a section of the intake manifold inlet duct 102 and communicates with duct 102 through hose couplings 185, 186. Pressure control apparatus 184 comprises a T-section 188 having a discharge outlet 190 and control ports 192 and 194. A threaded cap 191 is mounted on the cylindrical portion 188a of the T-section 188 and sealed thereto by a seal ring 193. An adjusting screw 195 is threaded into the cap 191 and carries a seat 197 on its inner end. The adjusting screw 195 may be locked in its adjusted position by locknut 199 and sealed with respect to the cap 191 by seal ring 201. A piston valve 196 is mounted for reciprocating motion in the cylindrical portion 188a of the T-section 188 and biased toward an annular seat 198 by a compression spring 200 which bears against one side of the seat 197. Control port 192 communicates with one side of piston valve 196 while control port 194 communicates with the opposite side of piston valve 196. A three-way normally open solenoid valve 202 communicates with control ports 192 and 194 in the de-energized condition and with control port 194 and ambient atmosphere in the energized condition. Preferably the solenoid valve 202 is connected electrically to the retarder control circuit in the same way that solenoid valve 170 in FIG. 3 is connected to the retarder control circuit. The solenoid valve 202 may be relatively small since the flow of air through it is low.

As shown in FIG. 4 the pressure regulator 184 will limit the pressure in the intake manifold to a predetermined maximum pressure which is a function of the spring rate and preload of the compression spring 200. Alternatively, the adjusting screw 195 may be rotated to vary the preload on the spring 200 thereby varying the regulated pressure produced by the regulator 184.

Figure 5:
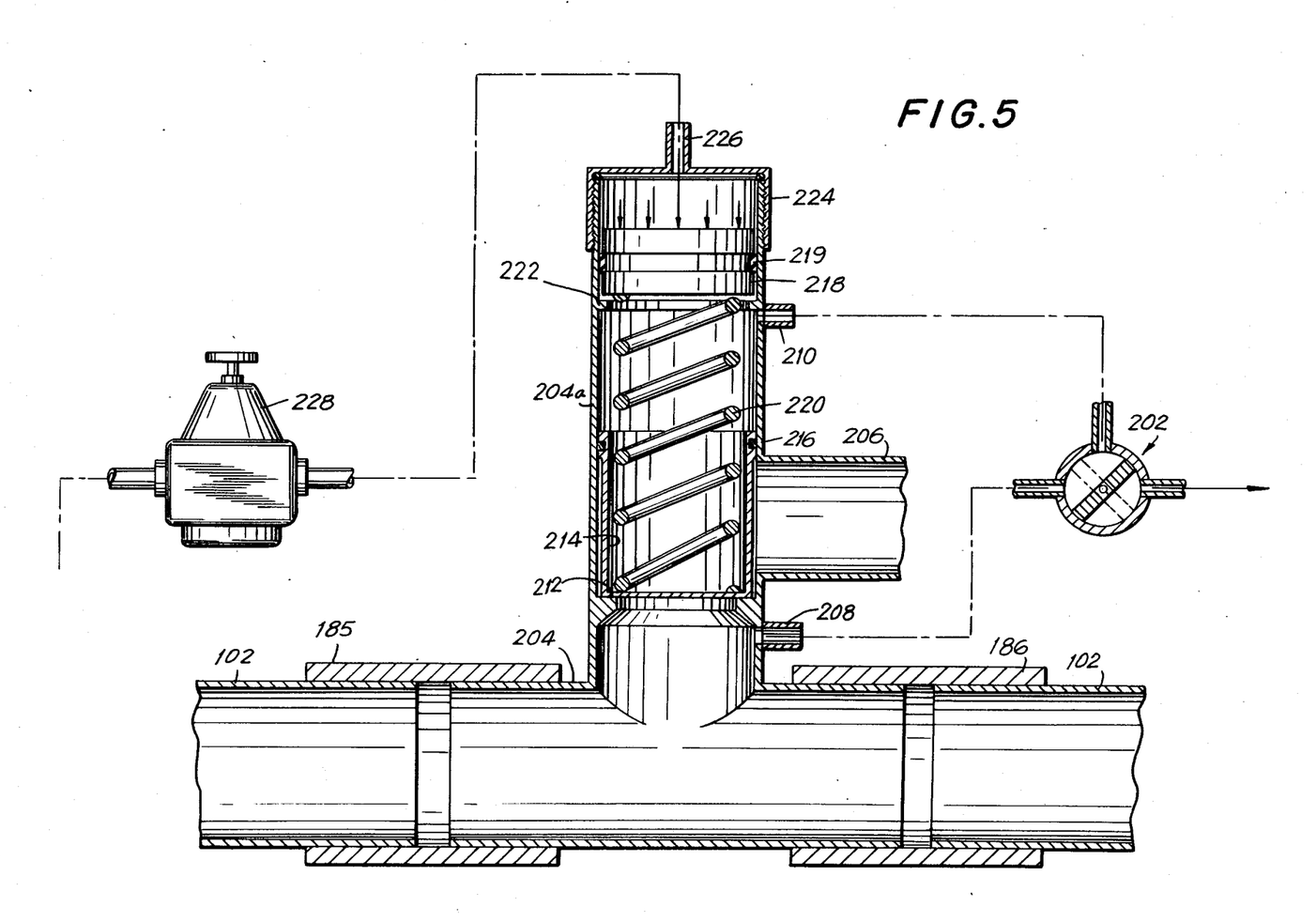
FIG. 5 is a cross sectional view of another alternative mechanism in accordance with the present invention installed in a duct communicating with the intake manifold.

FIG. 5 illustrates a variation of the apparatus shown in FIG. 4 whereby the adjustment of the operating pressure control point is facilitated. The apparatus of FIG. 5 may conveniently be installed in a duct, such as duct 102 communicating with the turbocharger outlet, and comprises a T-section 204 which communicates with the duct 102 through hose couplings 185, 186. The cylindrical portion 204a includes an exhaust outlet 206 and two control ports 208, 210. An annular seat 212 is located within the cylindrical portion 204a of the T-section between the control port 208 and the exhaust outlet 206. A piston 214 is mounted for reciprocating motion within the cylindrical portion 204a and is adapted to seat against the annular seat 212. If desired, a seal ring 216 may be positioned on the skirt of the piston 214 to provide a seal between the piston 214 and the cylindrical portion 204a. An air piston 218 is also mounted for limited reciprocating motion within the cylindrical portion 204a and is biased away from piston 214 by a compression spring 220.

A seal ring 219 may be mounted on the piston 218 to provide a seal between piston 218 and the cylindrical portion 204a of the T-section 204. Movement of the piston 218 toward piston 214 is limited by an annular stop 222 affixed to the inside of the cylindrical portion 204a. Control port 210 communicates with the cylindrical portion 204a between piston 214 and piston 218. The cylindrical portion 204a of the T-section 204 is sealed by a cap 224 containing a control port 226.

A three-way normally open solenoid valve 202 communicates with control ports 208 and 210 in the de-energized condition and with control port 210 and ambient atmosphere in the energized condition. Preferably the solenoid valve 202 is connected electrically to the retarder control circuit in the same way that solenoid valve 170 in FIG. 3 is connected to the retarder control circuit. The solenoid valve 202 may be relatively small since the flow of air through it is low.

A conventional pneumatic pressure regulator 228 communicates between a source of pressurized air, such as the vehicle air brake system, and control port 226. It will be seen that by adjusting the setting of the pressure regulator 228 the preload on the compression spring 220 may be varied. This will, in turn, determine the intake manifold air pressure required to move piston 214 away from the seat 212 when solenoid valve 202 is activated. Preferably, the pressure regulator 228 is located in the cab of the vehicle and is accessible to the driver so that the driver may adjust the maximum level of the intake manifold air pressure at will.

Although the apparatus shown in FIGS. 4 and 5 has been described as located in the duct leading from the outlet of the turbocharger, it may be located in any other duct communicating with the pressurized section of the air intake system, such as the air supply to the vehicle service brake compressor. Similarly, the apparatus shown in FIGS. 1, 2 and 3 may be located in any duct communicating with the pressurized section of the air intake system.

It will now be appreciated that in accordance with the present invention, the intake manifold air pressure may be controlled during compression release braking so as to control the maximum cylinder pressure and the retarding horsepower. This enables the operator to select the optimum degree of engine retarding without exceeding the desired maximum loading on the valve or injector components or on the piston, connecting rod and crankshaft. Although the invention is particularly useful in engines having compression release retarders of the type disclosed in the Cummins U.S. Pat. No. 3,220,392 it may also be used in engines having other forms of compression release retarders where it is desirable to control the retarding horsepower or cylinder pressure or to limit camshaft loads.

The terms and expressions which have been employed are used as terms of description and not of limitation and there is no intention in the use of such terms of excluding any equivalents of the features shown and described or portions thereof, but it is recognized that various modifications are possible within the scope of the invention claimed.

What is claimed is:

1. A method for retarding an internal combustion engine driven vehicle equipped with an engine having a turbocharger, a compression release engine retarder, an intake manifold, an intake manifold air pressure sensing means, a solenoid controlled intake manifold air pressure release means, and a solenoid control circuit, the method comprising the steps of actuating the compression release engine retarder, simultaneously engaging said solenoid control circuit, adjusting the said solenoid control circuit to a selected pressure level below a predetermined maximum pressure, continuously sensing the intake air manifold pressure, and releasing said intake manifold air pressure through said intake manifold air pressure release means whenever said intake manifold air pressure exceeds said selected pressure level whereby the retarding horsepower developed by said internal combustion engine is limited.

2. An engine retarding system of the gas compression release type comprising an internal combustion engine having intake manifold means and turbocharager means communicating with said intake manifold means, a compression release engine retarder operably interconnected with said internal combustion engine, said compression release engine retarder having first electric control circuit means, a solenoid valve, second electric circuit means interconnected with said solenoid valve and with said first electric circuit means, first pressure responsive means movable between a first closed position and a second open position, said first pressure responsive means communicating on a first side with said intake manifold and on a second side with said solenoid valve, said solenoid valve in its de-energized first position communicating between said first and second sides of said pressure responsive means whereby said pressure responsive means is maintained in said first closed position, said solenoid valve in its energized second position communicating between said second side of said pressure release means and ambient atmosphere whereby said pressure responsive means is movable from said first closed position to said second open position in response to a predetermined level of intake manifold air pressure so as to limit the intake manifold air pressure to said predetermined level.

3. An engine retarding system as described in claim 2 and comprising, in addition, means to vary the intake manifold air pressure at which said pressure responsive means moves from its first closed position to its second open position.

4. An engine retarding system as described in claim 3 in which said first pressure responsive means includes a compression spring and said means to vary the intake manifold air pressure at which said first pressure responsive means moves from its first closed position to its second open position comprises means to vary the preload on said compression spring.

5. An engine retarding system as described in claim 4 in which the means to vary the preload on said compression spring includes a pneumatic pressure regulator and a movable pneumatic piston juxtaposed against said compression spring, said pneumatic regulator adapted to communicate pneumatic pressure on said movable pneumatic piston.

6. An engine retarding system as described in claim 2 and comprising, in addiiton, a pressure sensing means communicating with said intake manifold means and said second electric circuit means and adapted to produce an electric signal proportional to the pressure in said intake manifold, said second electric circuit means including a voltage limiter adapted to produce an electric signal corresponding to a selected intake manifold air pressure and a voltage comparator adapted to compare the signals froom said pressure sensing means and said voltage limiter and energize said solenoid valve whenever the pressure in said intake manifold exceeds the selected intake manifold air pressure.

7. An engine retarding system of the gas compression release type comprising an internal combustion engine having intake manifold means and turbocharger means communicating with said intake manifold means, a compression release retarder operably connected to said internal combustion engine, said compression release retarder having a first electric control circuit, a solenoid valve movable between a first closed position and a second open position, said solenoid valve communicating with said intake manifold means, a pressure responsive means communicating between said solenoid valve and the ambient atmosphere, and movable in response to a predetermined pressure in said intake manifold means from a first closed position to a second open position, said pressure responsive means including means to vary the intake manifold air pressure at which said pressure responsive means moves from said first position to said second position, and second electric circuit means interconnecting said solenoid valve and said first electric control circuit means.

8. An engine retarding system as described in claim 7 in which said first pressure responsive means includes a compression spring and said means to vary the intake manifold air pressure at which said first pressure responsive means moves from its first closed position to its second open position comprises means to vary the preload on said compression spring.

* * * * *

UNITED STATES PATENT AND TRADEMARK OFFICE
CERTIFICATE OF CORRECTION

PATENT NO. : 4,688,384

DATED : August 25, 1987

INVENTOR(S) : Pearman et al.

It is certified that error appears in the above-identified patent and that said Letters Patent is hereby corrected as shown below:

| | |
|---|---|
| Col. 1, line 65 | "3,150,640" should be --4,150,640-- |
| Col. 6, line 24 | "156" should be --157-- |
| Col. 8, line 23 | "prdetermined" should be --predetermined-- |
| Col. 11, line 14 | "addiiton" should be --addition-- |
| Col. 11, line 22 | "froom" should be --from-- |

Signed and Sealed this

Sixteenth Day of February, 1988

Attest:

DONALD J. QUIGG

*Attesting Officer*    *Commissioner of Patents and Trademarks*